United States Patent [19]

Sano

[11] Patent Number: 5,016,723
[45] Date of Patent: May 21, 1991

[54] HYDRAULIC POWER STEERING APPARATUS

[75] Inventor: Osamu Sano, Osaka, Japan

[73] Assignee: Koyo Seiko Co., Ltd., Osaka, Japan

[21] Appl. No.: 435,240

[22] Filed: Nov. 9, 1989

[30] Foreign Application Priority Data

Nov. 15, 1988 [JP]  Japan .................................. 63-288143
Apr. 7, 1989 [JP]  Japan .................................... 1-88259

[51] Int. Cl.[5] .............................................. B62D 6/02
[52] U.S. Cl. .................................. 180/143; 91/375 A; 91/402; 137/625.21
[58] Field of Search ............. 180/141, 143; 91/375 A, 91/402, 357, 374; 137/625.21

[56] References Cited

U.S. PATENT DOCUMENTS

| | | |
|---|---|---|
| 4,034,825 | 7/1977 | Adams . |
| 4,632,204 | 12/1986 | Honaga et al. ........................ 180/143 |
| 4,796,715 | 1/1989 | Futaba et al. ......................... 180/143 |
| 4,848,500 | 7/1989 | Komine et al. ....................... 180/143 |
| 4,860,846 | 8/1989 | Uchida et al. ........................ 180/141 |

FOREIGN PATENT DOCUMENTS

| | | |
|---|---|---|
| 53-45571 | 12/1978 | Japan . |
| 60-38219 | 11/1985 | Japan . |
| 0226369 | 11/1985 | Japan .................................. 180/143 |
| 61-163061 | 7/1986 | Japan . |
| 0275062 | 12/1986 | Japan . |

Primary Examiner—Charles A. Marmor
Assistant Examiner—Mitchell Bompey
Attorney, Agent, or Firm—Townsend and Townsend

[57] ABSTRACT

The hydraulic power steering apparatus of the present invention has plungers being installed movably at part of a casing of a hydraulic control valve and a reaction chamber being formed at one side of the plungers, and varies hydraulic pressure to be supplied to a hydraulic pressure reacting portion for generating restriction force corresponding to supplied hydraulic pressure according to vehicle speed and quantity of relative movement between a valve body and a casing of hydraulic control valve, thereby the supplied hydraulic pressure being increased as the vehicle speed becomes higher and steering angle becomes larger.

3 Claims, 9 Drawing Sheets

//<!-- -->
HYDRAULIC POWER STEERING APPARATUS

BACKGROUND OF THE INVENTION

1. Field of the Invention

The present invention relates to a hydraulic power steering apparatus whose source of steering assisting force is hydraulic actuator, and more particularly to a power steering apparatus having a hydraulic pressure reaction apparatus which restricts control operation of a hydraulic control valve for controlling hydraulic pressure being supplied to aforesaid hydraulic actuator.

2. Description of Related Art

A hydraulic power steering apparatus, whose source of steering assisting force is a hydraulic actuator such as a hydraulic cylinder being provided in a steering mechanism, has such construction as follows. In the case where an input shaft being connected to a steering wheel and an output shaft connecting operationally to a steering front wheel are connected on a coaxial line through a torsion bar and then steering torque is exerted upon the steering wheel, relative angular displacement is adapted to be created between the two shafts according to torsion of the torsion bar accompanying the above case. In addition, there is provided at aforesaid connected portion with a hydraulic control valve comprising a cylindrical casing which rotates interlockingly with one of the shafts and a valve body which is fitted into the casing coaxially therewith and which rotates interlockingly with the other shaft. The hydraulic pressure being supplied to aforesaid hydraulic actuator is controlled by operation of the hydraulic control valve according to the direction and magnitude of aforesaid steering torque, thereby steering assisting force being obtained.

It is well-known that the magnitude of force being required for the steering operation for steering corresponds to the magnitude of reaction force acting upon the steering front wheel from the surface of a road, and that this magnitude of reaction force corresponds to vehicle speed. On the other hand, in aforesaid power steering apparatus, corresponding relationship between steering torque being exerted upon the steering wheel and the steering assisting force being generated by the hydraulic actuator is decided only by the torsion characteristics of said torsion bar.

Accordingly, in the case where this torsion bar is selected on the basis of big reaction force of the vehicle which is stopped or runs at a low speed running, there is a problem that its steering is carried out by a slight power being exerted upon the steering wheel at its high speed running, resulting in aggravation of rectilinear propagation stability. On the contrary, in the case where the torsion bar is selected on the basis of its high speed running, there is a problem that sufficient steering assisting force cannot be obtained at the stopped state and at the low speed running of the vehicle.

In order to solve above-mentioned problems, there has been developed a power steering apparatus being provided with a hydraulic pressure reacting portion at the connected portion of said input shaft with the output shaft, the hydraulic control valve being provided in parallel relation therewith. According to the hydraulic reacting portion, hydraulic pressure reaction whose magnitude is variable corresponding to the vehicle speed is applied between the both shafts, thereby control operation of said hydraulic control valve being created according to the relative angular displacement of the both shafts, is restricted by strong power at its high speed running, so is by weak power at its low speed running.

Figure 1:
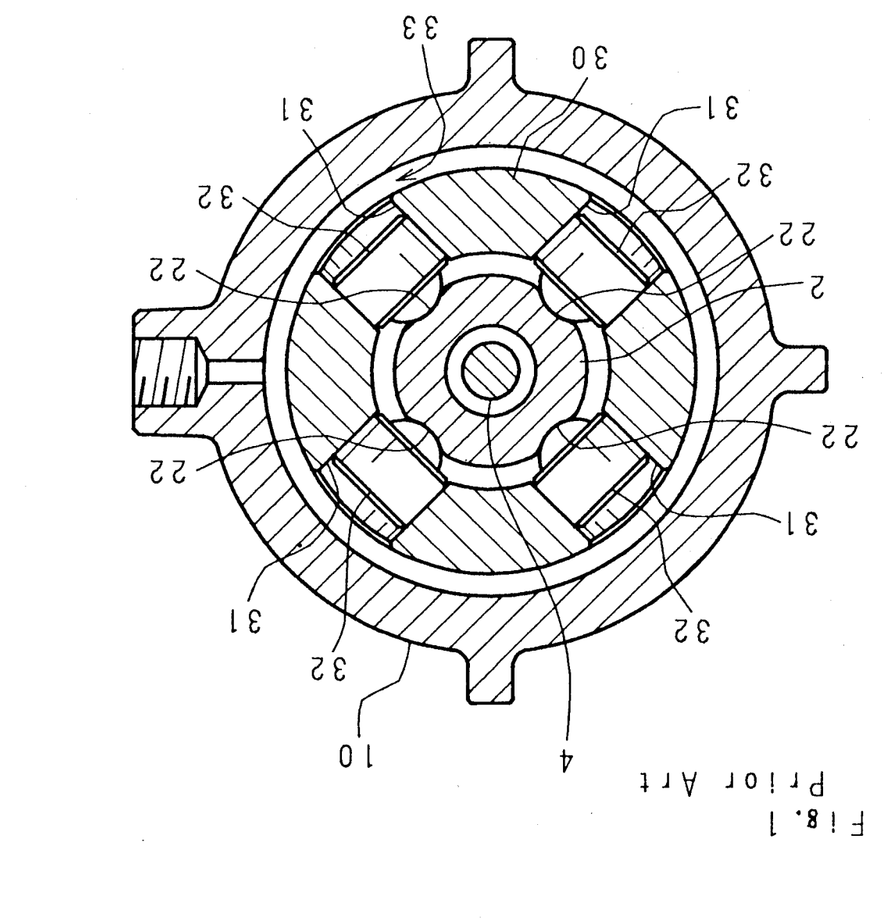
FIG. 1 is a cross sectional view of a hydraulic reacting portion in the conventional power steering apparatus.

FIG. 1 is an enlarged cross sectional view of major parts showing an example of the conventional hydraulic pressure reacting portion. The hydraulic pressure reacting portion is provided in a cylindrical housing 10 supporting both of the input and output shafts at their connected portion. In the figure, reference numeral 30 designates a cylindrical portion being disposed so as to be connected coaxially with the end of the connected portion of the output shaft for example, the cylindrical portion being fitted rotatably into the housing 10. Between the cylindrical portion 30 and the inner peripheral surface of the housing 10, there is formed a reaction chamber 33 as a ring space having an appropriate width in the axial direction. Inside of the cylindrical portion 30, a part of an input shaft 2 is loosely fitted, and on the outer peripheral surface of the part, a plurality of concave portions 22, 22 . . . are formed in a circumferential direction at equal interverals with each other. In addition, in cylindrical portion 30, through holes 31, 31 . . . which pass through in the radial direction are formed at the circumferential direction at almost equal intervals with each other at the positions corresponding to the respective concave portions 22, 22 . . . . Respective plungers 32, 32 . . . are fitted in these respective through holes 31, 31 . . . so as to be slidable along them. Respective plungers 32, 32 . . . are provided with respective semi-spherical convex portions at the inner end thereof, the convex portions being engaged with the concave portions 22, 22 . . . being formed at the outer circumference of the input shaft 2 as shown in the figure.

In the figure, reference numeral 4 designates a torsion bar connecting the input shaft 2 to the output shaft. When steering torque is exerted upon the steering wheel, relative angular displacement accompanying the torsion of the torsion bar 4 is adapted to be created between the input shaft 2 being connected to the steering wheel and the output shaft whose rotation is restricted by the reaction force being acted upon the steering front wheel from the surface of a road. As descried earlier, by the operation of the hydraulic control valve (not shown) which is arranged at the connecting portion of both shafts so as to be in parallel relation with the hydraulic reacting portion, the hydraulic pressure being supplied to the hydraulic actuator in use for steering assisting is controlled according to the relative angular displacement.

On the other hand, plungers 32, 32 . . . at the hydraulic reacting portion is pressed against to the inwardly radial direction thereof by hydraulic pressure inside of the reaction chamber 33, acting upon the outside end surfaces of plungers 32, 32 . . . , thereby the inside end portions thereof being engaged with the concave portions 22, 22 . . . on the outside circumference of the input shaft 2. Consequently, the relative angular displacement between the input shaft 2 and the cylindrical portion 30 forming a part of the output shaft is restricted by force corresponding to the hydraulic pressure. Accordingly, it seems as if reaction force corresponding to the hydraulic pressure is acting upon the output shaft side. Until the steering torque being exerted upon the input shaft 2 through the steering wheel reaches a magnitude which forces up the plungers 32, 32 . . . in an outwardly radial direction against the hydraulic pressure, the relative angular displacement is not created and operation of the hydraulic control valve is not carried out, as the result, the hydraulic actuator does not generate the steering assisting force. Accordingly, by introducing a hydraulic pressure which becomes high and low correspondingly to the vehicle speed into the reaction chamber 33, an appropriate rigidity is applied to the steering wheel at a high speed running of a vehicle, resulting in realizing the rectilinear stability to be improved. At the same time, it is also realized that the sufficient steering assisting force can be obtained at the stopped state and at the low speed running of the vehicle so as to reduce the power being required for steering operation as much as possible.

For means to make introduced hydraulic pressure to the reaction chamber 33 correspond to the vehicle speed, various kinds of proposals have been made. In a power steering apparatus disclosed in U.S. Pat. No. 4,796,715, an oil path being connected to a pressure oil tank through a variable throttle valve and a fixed throttle valve is provided at a discharge side of a hydraulic pump for generating a predetermined hydraulic pressure. The hydraulic pressure between the both throttle valves in the middle of the oil path is utilized as the introduced hydraulic pressure to the reaction chamber 33, and degree of throttle opening of the variable throttle valve is made to be variable according to the detected result of the vehicle speed sensor, whereby the introduced hydraulic pressure corresponding to the vehicle speed is obtained. In Japanese Patent Publication No. 53-45571 and in Japanese Utility Model Publication No. 60-38219 by an applicant of the invention, it is disclosed that a generated hydraulic pressure of a hydraulic pump (gear pump is used in the former publication and trochoid pump in the latter publication) being installed at an output shaft of a transmission and being driven by a speed corresponding to the vehicle speed, is directly introduced into the reaction chamber as hydraulic pressure corresponding to the vehicle speed.

Figure 2:
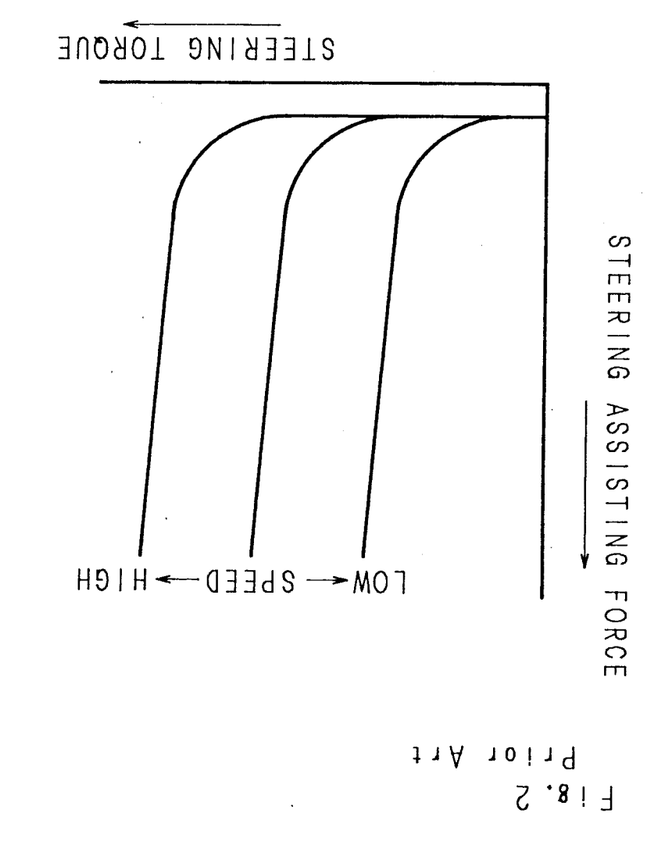
FIG. 2 is a graph showing an increase characteristic of steering assisting force in the conventional power steering apparatus.

FIG. 2 is a graph showing the correlation between steering torque being exerted upon the steering wheel of the power steering apparatus being provided with such a hydraulic pressure reacting portion as above constructed and the steering assisting force being generated due to the steering torque by the hydraulic actuator for steering assisting. As shown in this figure, in the conventional power steering apparatus, by the operation of the hydraulic pressure reacting portion, steering torque is kept to be almost zero until the steering assisting force reaches a predetermined magnitude, and after that, rapidly increasing steering torque is obtained. In addition, a characteristic is obtained that a raised point of the steering assisting force shifts to the side where steering torque is larger as the vehicle speed becomes high because the introduced hydraulic pressure to the reaction chamber 33 is made to correspond to the vehicle speed.

Now in the case where the actual steering feeling is considered, it is desirable for the rigidity of the steering wheel to increase as the steering angle increases. However, the conventional power steering apparatus, as apparent from the FIG. 2, has a characteristic that the steering assisting force increases rapidly. That is, after the steering torque acting upon the steering wheel passes the raised point, the rigidity of the steering wheel is kept almost constant, resulting in a problem to create slight incompatibility of steering feeling. In order to solve this problem, a characteristic that the steering torque shows a relatively slow increase manner is required after the steering torque passes the raised point. Such a characteristic is possible to be realized by changing the opening degree of the variable throttle valve according to the detected result of the steering angle as well as the detected result of the vehicle speed in a power steering apparatus disclosed in the U.S. Pat. No. 4,796,715. However, the construction of the control unit for performing change of opening degree becomes complicated as well as a sensor for detecting steering angle is required besides the vehicle sensor, resulting in a problem that malfunction is possibly generated at each part. In comparison with the above apparatus, in a power steering apparatus which utilizes a generated hydraulic pressure of a hydraulic pump (hereinafter referred to as a vehicle speed sensor pump) for generating a hydraulic pressure corresponding to the vehicle speed, there is no problem that the malfunction is created, however, it has been considered to be difficult to realize aforesaid desirable characteristic.

SUMMARY OF THE INVENTION

The present invention has been devised to solve the problems of the prior art mentioned above, and the primary object of the invention is to provide a power steering apparatus realizing the desirable characteristic, that is, rigidity of the steering wheel increases as the vehicle speed and the steering angle increase, by changing the restriction force of the input shaft and output shaft according to the relative movement quantity of the vehicle speed, input shaft and output shaft.

In order to accomplish the object, the power steering apparatus related to the invention is provided with a hydraulic control valve which controls a hydraulic pressure being supplied to the hydraulic actuator generating a steering assisting force according to relative movement quantity of the valve body and casing, accompanying with the operation of steering wheel, a first restricting means for exerting restriction corresponding to the vehicle speed upon the relative movement of the valve body and casing, and a second restricting means for exerting restriction corresponding to the relative movement quantity thereof to the relative movement of the valve body and casing.

This leads to variation of hydraulic pressure in the reaction chamber concerning both the vehicle speed and the steering angle, thereby, restriction against the relative movement of the casing and the valve body changes.

The above and further objects and features of the invention will more fully be apparent from the following detailed description with accompanying drawings.

DESCRIPTION OF THE PREFERRED EMBODIMENTS

Now description will be made on the embodiment of the invention referring to the drawings.

Figure 3:
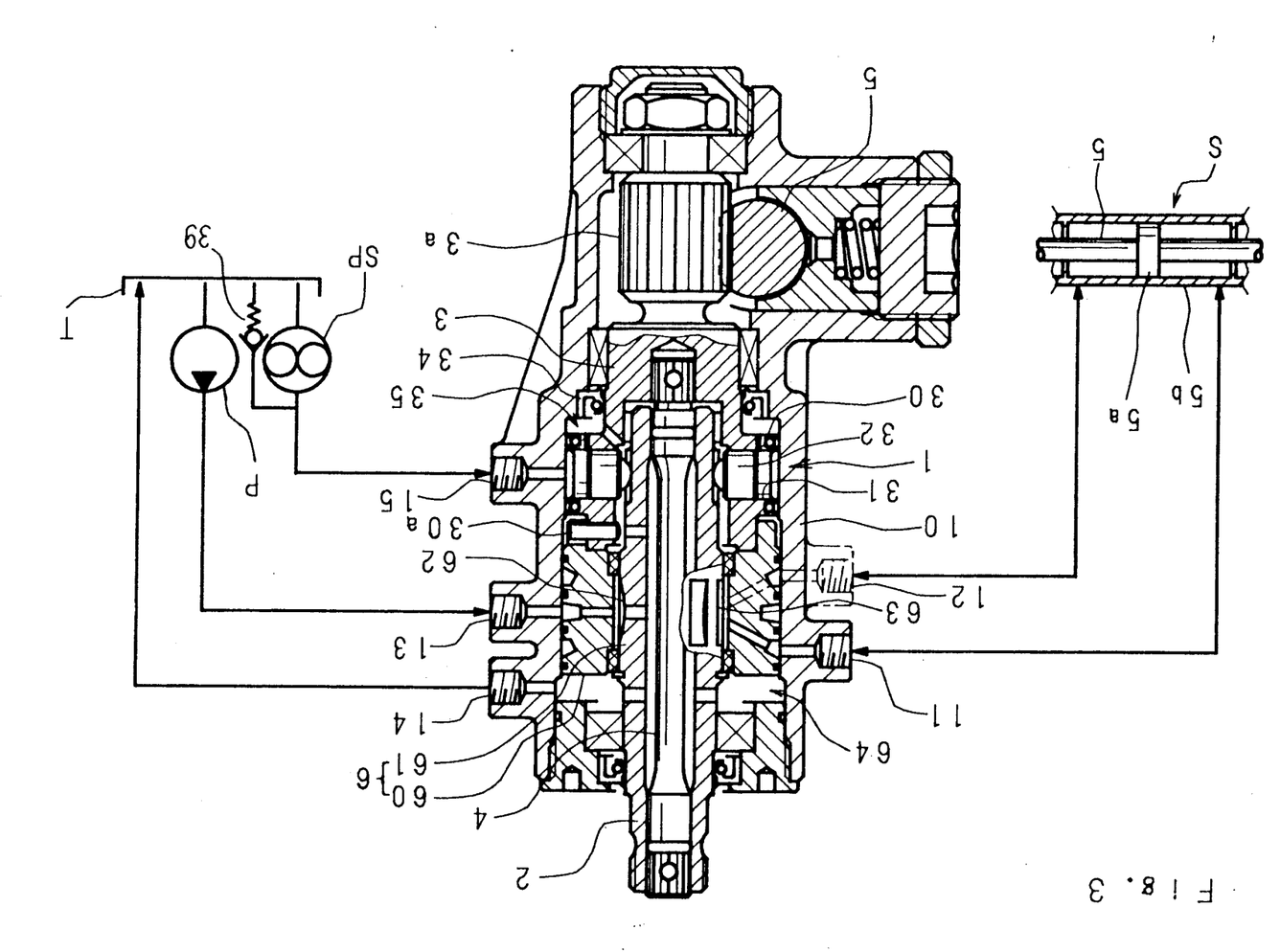
FIG. 3 is a longitudinal sectional view showing the major parts of the power steering apparatus related to the invention.

In FIG. 3, reference numeral 2 designates a hollowed input shaft, and 3 designates an output shaft. These shafts are supported rotatably around the respective axis centers in a common cylindrical housing 10, and are connected coaxially through a torsion bar 4 being inserted in the hollow portion of the input shaft 2. One end part of the input shaft 2 appropriately projecting outside the housing 10 is connected to the steering wheel (not shown), a steering torque being exerted on the steering wheel being adapted to be transmitted to the part. In addition, the output shaft 3 is operationally connected to the steering front wheel (not shown) so that steering corresponding to rotation quantity of the output shaft 3 can be carried out. As shown in the drawing, the connection is realized by engaging a pinion 3a being formed at the outside circumference of the output shaft 3 with a rack shaft 5 in a steering mechanism in a vehicle with a steering mechanism of rack-pinion system, for example. The rotation of the output shaft 3 is converted to a movement in the axial direction of the rack shaft 5 through the pinion 3a, and steering is to be carried out correspondingly to the above movement. Further, in the middle of the rack shaft 5, there is provided a hydraulic cylinder S in use for steering assisting, which is a hydraulic actuator consisting of a circular plate-like piston 5a being coaxially fixed on the rack shaft 5 and a cylindrical housing 5b surrounding the rack shafts 5 at both sides including the piston 5a in the state that the rack shafts 5 are sealed off liquid densely extending a predetermined length. According to the difference between respective supplied hydraulic pressures to both of the hydraulic chambers of the hydraulic cylinder S, movement of the rack shaft 5, that is, power being required for steering is adapted to be assisted.

The output shaft 3 is provided, at the end portion of its connected side with the input shaft 2, with a cylidrical portion 30 being disposed coaxially so as to be connected with the input shaft 2. The appropriate length of the end portion of its connected side of the input shaft 2 is loosely fitted in this cylindrical portion 30. The hydraulic control valve 6 for controlling the supplied hydraulic pressure to the hydraulic cylinder S is consisting of a casing 60 of a short cylindrical shape being fitted into rotatably in the housing 10 and a valve body 61 being formed at a part of the input shaft 2 being fitted into this casing 60.

The casing 60 is provided with, at its inner peripheral surface, a plurality of long grooves 62, 62 ... having a predetermined width respectively, being distributed at the same intervals with each other to be extended in the axial direction. The casing 60 is constructed to rotate in synchronism with the rotation of the output shaft 3 since a part of it is engaged with a whirl stop pin 30a being hammered at the cylindrical portion 30. On the outside of the peripheral surface of the valve body 61, at positions corresponding to the respective long grooves 62, 62 ..., the corresponding number of long grooves 63, 63 ... to those grooves 62, 62 ... are formed to have each predetermined width being appropriately extended in the axial direction and at equal intervals, in the circumferential direction. The casing 60 and the valve body 61 are positioned so that they can communicate with each other through a predetermined interval, respective aforesaid long grooves 62 and 63 being zig-zag-arranged and being adjoined to each other on both sides in the circumferential direction. The long grooves 62, 62 ... at the side of casing 60, through individual introducing pressure ports 11 and 12 which penetrate through the inside and outside of the housing 10, communicate with both the hydraulic chambers of the hydraulic cylinder S alternately. On the other hand, the long grooves 63, 63 ... at the side of valve body 61 whose half the number being positioned alternately are connected with the hydraulic pump P being the hydraulic pressure side through an introducing port 13 penetrating through the inside and outside of the housing 10. In addition, the remaining half grooves communicate with a return chamber 64 being formed at one side of the casing 60 through the hollow part of the input shaft 2, and are connected with an oil tank T being maintained at a low pressure state through a return port 14 penetrating through the inside and outside of the housing 10.

Figure 4:
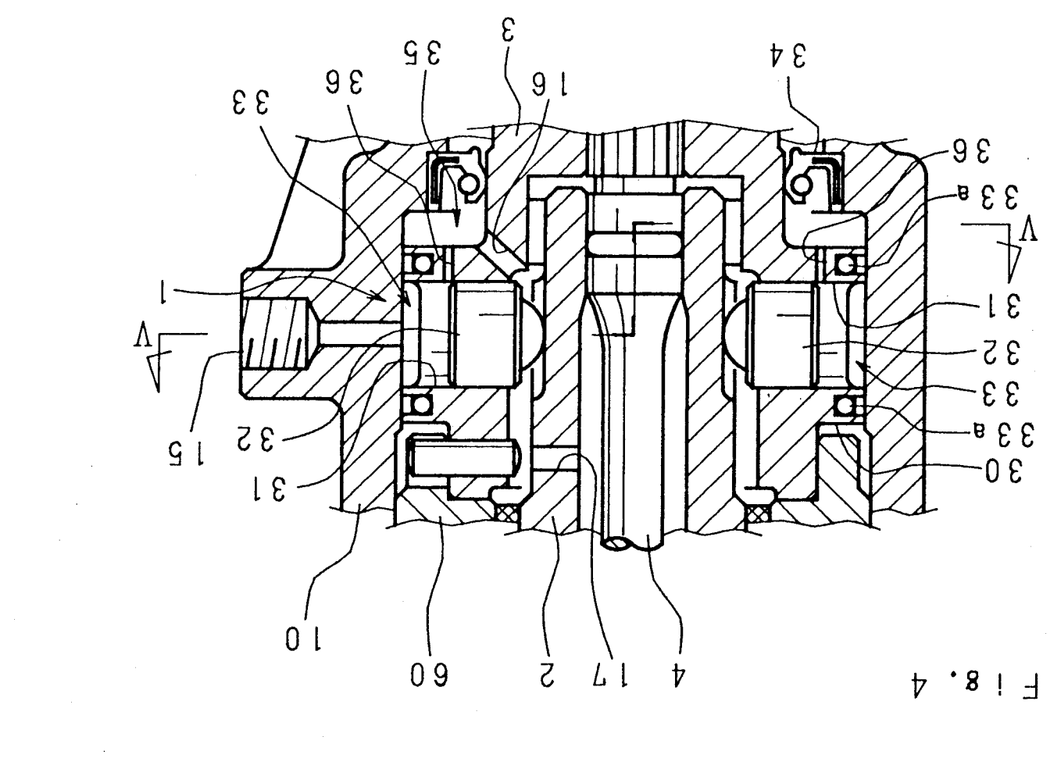
FIG. 4 is a partly enlarged view of FIG. 3 showing a construction of the hydraulic pressure reacting portion.
Figure 5:
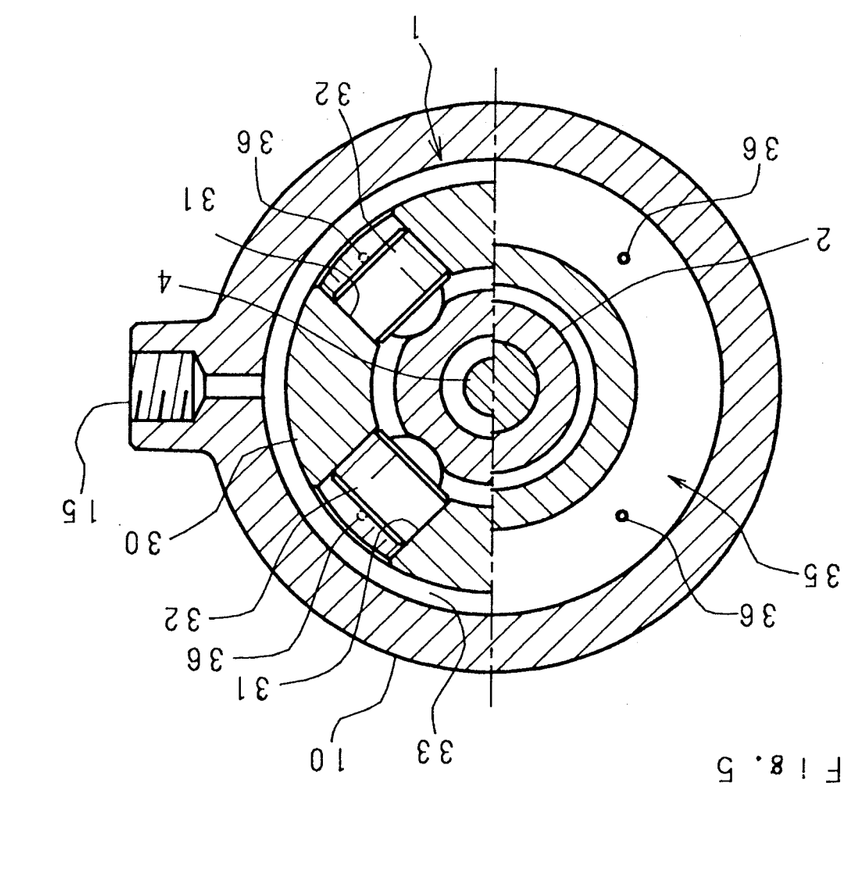
FIG. 5 is a cross sectional view along the line V—V shown in FIG. 4.

Brief explanation will be made on the operation of the hydraulic control valve 6 as mentioned above. In the case where steering torque is exerted upon the steering wheel, the input shaft 2 being connected therewith will rotate so as to associate with the rotation of the steering wheel. On the other hand, the output shaft 3 connecting with the steering front wheel through the rack shaft 5 and the pinion 3a, is restricted its rotation because of reaction force from the surface of a road acting upon the steering front wheel. As a result, torsion is created on the torsion bar 4 connecting the both shafts according to the steering torque, leading to create relative angular displacement between the valve body 61 being formed at a part of the input shaft 2 and the casing 60 being restricted its rotation by the output shaft 3. Accordingly, when one of the space areas of both sides of long grooves 63 of the valve body 61 increases, the other decreases at the same time. As a result, the hydraulic pressure being introduced from the hydraulic pump P into one group of the long grooves 63, 63 ... which are connected with the introducing port 13, passes through the space on the side where the area increases and then flows into the long grooves 62, 62 ... of the casing 60 neighboring respectively on the same sides and supplied to one hydraulic chamber of the hydraulic cylinder S through the introducing pressure port 11 or 12 being connected with the long grooves 62, 62 .... Then the hydraulic oil in the other hydraulic chamber of the cylinder S, through the introducing pressure port 12 or 11, is returned into the long grooves 62, 62 ... in the casing 60 being connected to the introducing pressure port 12 or 11. Furthermore, the hydraulic oil is introduced into the other group of the long grooves 63, 63 ... neighboring respectively on the same sides and is returned into the oil tank T through the return chamber 64 and the return port 14. Thereby, pressure difference between both of the hydraulic chambers of the hydraulic cylinder S is created, and steering assisting force corresponding to the pressure difference is exerted upon the rack shaft 5. At that time, magnitude of steering assisting force being generated by the hydraulic cylinder S depends upon a varied state of throttled area being created at the space between the long grooves 62 and 63 according to the relative angular displacement, and the varied state always corresponds to a torque state of the torsion bar 4. Accordingly, only torque characteristics of the torsion bar 4 can decide corresponding relationship between the steering torque being exerted upon the steering wheel and the steering assisting force being generated by the hydraulic cylinder S according to such operation of the hydraulic pressure control valve 6 as corresponding to the steering torque. Consequently, as aforementioned, failure in rectilinear propagation stability at the high speed running of a vehicle, or shortage of the steering assisting force at the low speed running of a vehicle is to be created. The hydraulic pressure reacting portion 1, solving the above-mentioned problems by applying force corresponding to the vehicle speed between the input shaft 2 and the output shaft 3 to restrict the relative angular displacement, is installed at the cylindrical portion 30 being connectedly disposed at the end portion of the connected side of the output shaft 3. FIG. 4 is an enlarged view of major parts of FIG. 3 showing the construction of the hydraulic pressure reacting portion 1 which is a characteristic of the present invention. FIG. 5 is a cross sectional view along the V—V line shown in FIG. 4.

At the cylindrical portion 30, a plurality of through holes 31, 31 . . . penetrating the cylindrical portion 30 in the radial direction thereof are formed at equal intervals in the circumferential direction. Each of the plungers 32, 32 . . . of short cylindrical shape are slidably and movably fitted into these through holes, respectively. The cylindrical portion 30 at its outside circumferential side is provided with an annular groove connecting with the outside end portion of the through holes 31, 31 . . . . The cylindrical portion 30 is rotatably fitted into the housing 10 with the outside peripheral surface of the both sides of the annular groove being sealed off liquid-densely by individually wound O-rings 33a, 33a and the like. The annular space being surrounded by both of the bottom surface of the annular groove and the inside peripheral surface of the housing 10 is used as the reaction chamber 33. This reaction chamber 33 is connected to a discharge side of a vehicle speed sensor pump SP through an introducing port 15 being formed to penetrate through the housing 10. The vehicle speed sensor pump SP is installed at an output shaft of a transmission in the same way as the one disclosed in, for example, Japanese Utility Model Publication No. 60-38219. The vehicle speed sensor pump SP is a kind of a hydraulic pump such as a trochoid pump and the like being driven by a speed corresponding to the vehicle speed, generating hydraulic pressure corresponding to the vehicle speed. Reference numeral 39 designates a relief valve being provided to be parallel with the vehicle speed sensor pump SP so as to prohibit an excessive hydraulic pressure from acting upon the reaction chamber 33. The plungers 32, 32 . . . are provided with semispheric convex portions at the inside end portion thereof. At the input shaft 2 being loosely fitted to have an appropriate length inside of the cylindrical portion 30, the concave portions corresponding to the convex portions are formed at equal intervals in the circumferential direction on the outside peripheral surface of the input shaft 2. In the case where steering torque is not applied on the steering wheel, and the relative angular displacement is not created between the steering wheel and the output shaft 3, the input shaft 2 is positioned so that the concave portions thereof conform to the installed positions of the plungers 32, 32 . . . in the circumferential direction. As shown in FIG. 5, convex portions being tip of the plungers 32, 32 . . . are engaged with the concave portions, respectively.

The construction above mentioned is quite the same as the conventional hydraulic pressure reacting portion. In the power steering apparatus related to the present invention, the return chamber 35 being sealed off at both sides in the axial direction by both one O-ring 33a being wound around the outer circumference of the cylindrical portion 30 and an oil seal 34 slidably touching the outer circumference of the output shaft 3 being fitted into the housing 10, is arranged in parallel with the reaction chamber 33 to be positioned on the side opposite to the connected side with the hydraulic control valve 60 of the cylindrical portion 30. This return chamber 35 is communicated with the hollow part of the input shaft 2 according to both of a return port 16 being formed by making one end thereof open and penetrating the cylindrical portion 30 through and a return port 17 being formed by penetrating the input shaft 2 through. In addition, the return chamber 35 is communicated with the oil tank T being maintained to be at a low pressure through both the hollow part and the return chamber 64. Further, the return chamber 35 is communicated with the through holes 31, 31 . . . by its individual throttle holes 36, 36 . . . with minimum diameters, respectively. As shown in FIG. 4 and FIG. 5, in the case where the convex portions being tips of the plungers 32, 32 . . . are at the projecting position being engaged with the concave portions of outer circumference of the input shaft 2, the throttle holes 36, 36 . . . are adapted to open slightly close to the outer circumference from these outside end portions.

At the hydraulic pressure reacting portion 1 as above constructed, the pressure oil being delivered from the vehicle speed sensor pump SP and being introduced into the reaction chamber 33 leaks in the return chamber 35 after passing through the throttle holes 36, 36 . . . being formed at through holes 31, 31 . . . , and from the return chamber 35, the pressure oil returns to the hydraulic tank T after passing through the return holes 16, 17, the hollow part of the input shaft 2, and the return chamber 64. Accordingly, the hydraulic pressure in the reaction chamber 33 varies according to the pressure being generated at the vehicle speed sensor pump SP and the size of flow resistance at the throttle holes 36, 36 . . . . In the case where steering torque is not exerted upon the steering wheel, and the relative angular displacement is not created between the input shaft 2 and the output shaft 3, the plungers 32, 32 . . . are placed at the position shown in FIG. 4 and FIG. 5, where the throttle holes 36, 36 . . . are opened. And at that time, a hydraulic pressure in the reaction chamber 33 corresponds only to the vehicle speed, the plungers 32, 32 . . . being pushed against the output shaft 2 by the hydraulic pressure. As a result, the relative angular displacement between both of the shafts 2 and 3 is restricted by force corresponding to the vehicle speed, thereby, the control operation of the hydraulic control valve 60 is not carried out until the steering torque reaches enough magnitude to disengage the engagement of the plungers 32, 32 . . . , steering assisting force being generated by the hydraulic cylinder S is kept substantially zero. In addition, after the disengagement is brought about, according to the movement of the plungers 32, 32 . . . accompanying the disengagement, the throttle holes 36, 36 . . . are closed. As a result, the hydraulic pressure in the reaction chamber 33 becomes higher than that before the disengagement, thereby, the plungers 32, 32 . . . are pushed against the outer circumference of the output shaft 2 by stronger force.

Figure 6:
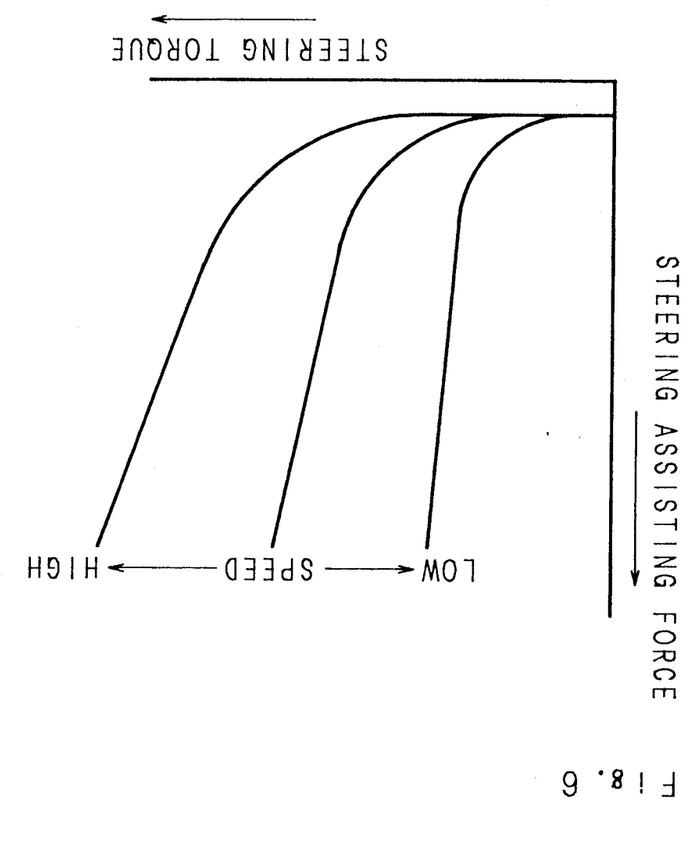
FIG. 6 is a graph showing an increase characteristic of steering assisting force of the power steering apparatus related to the present invention.

FIG. 6 is a graph showing characteristics of the power steering apparatus related to the invention. In the power steering apparatus related to the invention, the steering assisting force is kept to be substantially zero in the same way as the conventional apparatus until the steering torque reaches its predetermined magnitude and the disengagement of the plungers 32, 32 . . . is brought about. On the contrary, the increase rate of the steering assisting force against more steering torque than the predetermined magnitude is reduced when compared with the conventional power steering apparatus because the throttle holes 36, 36 . . . are closed according to the movement of plungers 32, 32 . . . which have been disengaged and the hydraulic pressure in the reaction chamber 33 is increased. And since the introduced hydraulic pressure to the reaction chamber 33 corresponds to the vehicle speed, the degree of reduction of the increase rate shows a tendency that it increases as the vehicle speed becomes higher.

According to such characteristics as aforementioned, in a vehicle provided with the power steering apparatus related to the present invention, after the steering torque to be exerted upon the steering wheel reaches the predetermined magnitude, the rigidity of the steering wheel is not liable to be constant, thereby a desirable steering feeling results in which the rigidity of the steering wheel increases continuously accompanying the increase of the steering torque.

Figure 7:
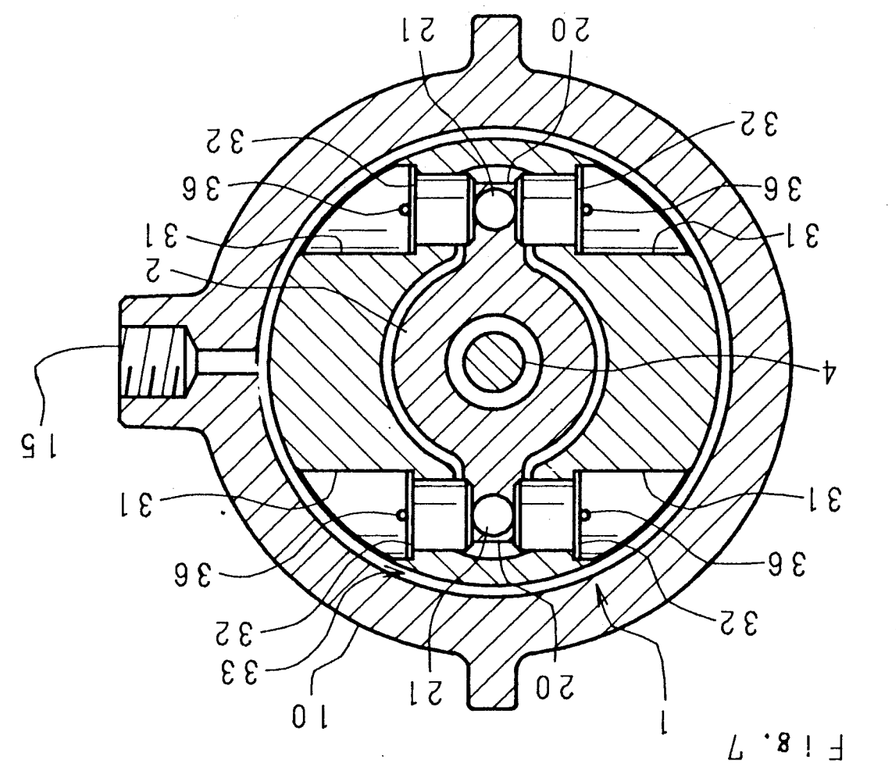
FIG. 7 is a cross sectional view of the another embodiment of the hydraulic pressure reacting portion of the invention.

FIG. 7 is a cross sectional view showing another embodiment of the invention. The figure shows an example, in which the present invention is applied at the hydraulic pressure reacting portion of such a construction as disclosed in Japanese Patent Application Laid-Open No. 61-163061. In the figure, the input shaft 2 has no concave portion at its outer circumference and is provided with a pair of projections 20, 20 projecting radially outwardly. On the projections 20, 20, individual reaction pins 21, 21 are hammered in the axial direction of the input shaft 2. Receiving the hydraulic pressure in the reaction chamber 33, respective reaction pins 21, 21 are held at the both sides thereof by the each two plungers 32, 32 slidably moving in the opposite direction to each other along the respective through holes 31, 31 . . . . It is obvious that in the hydraulic pressure reacting portion 1 of such construction as the above, the characteristics as shown in FIG. 6 can be obtained by providing, as shown in the figure, throttle holes 36, 36 . . . opening and closing according to the movement of the plungers 32, 32 . . . and making the reaction chamber 33 communicate with a low pressure side through these throttle holes 36, 36 . . . .

In addition, the construction of the hydraulic pressure reacting portion 1 is not restricted to the one shown in FIG. 5 and FIG. 6 but any construction will do if it meets such qualifications as that it is capable of restricting the relative angular displacement between the valve body of the hydraulic control valve and the casing by the plungers receiving on one side thereof the hydraulic pressure corresponding to the vehicle speed, and that the plunger can move according to the relative angular displacement.

Figure 8:
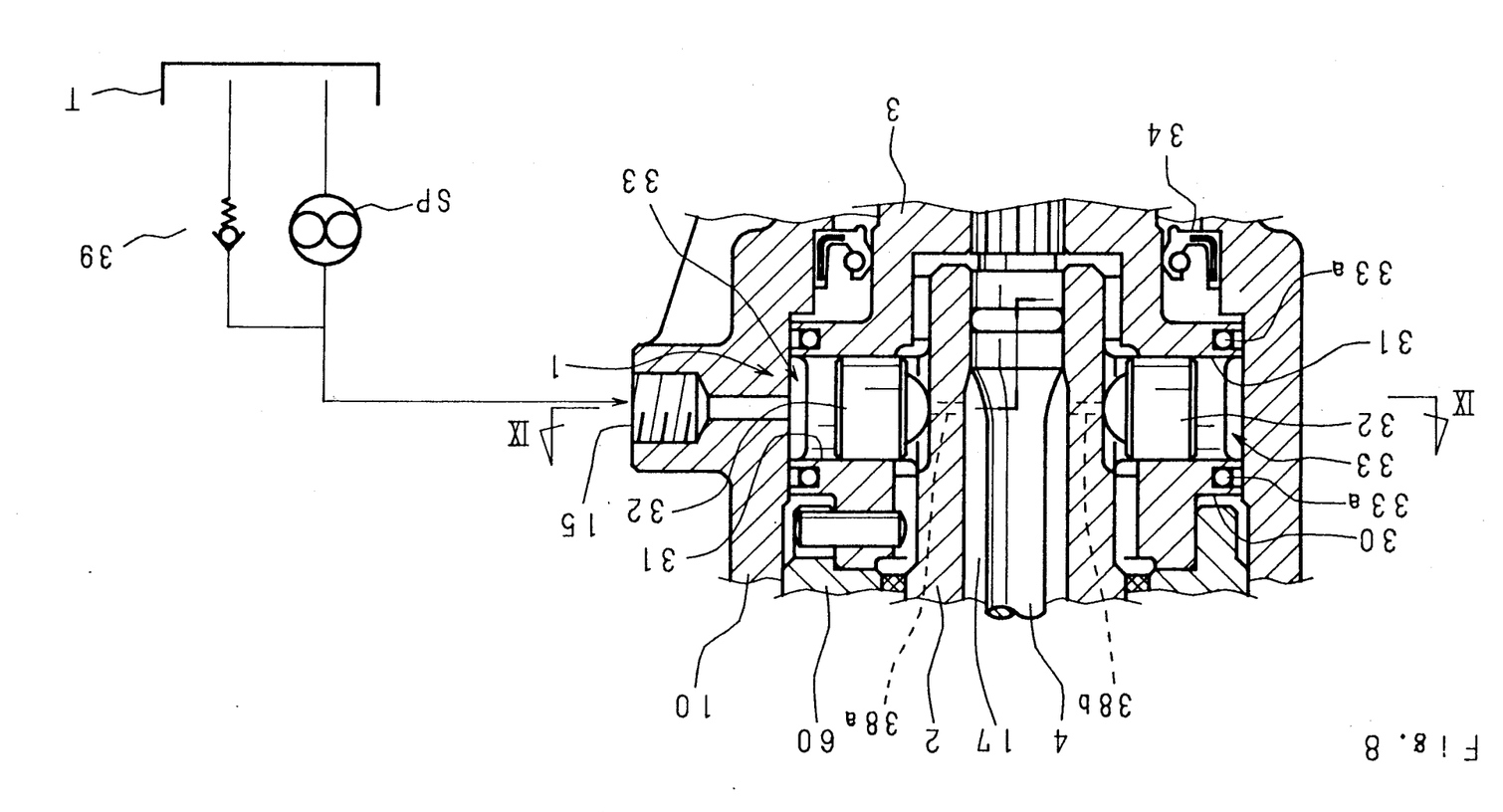
FIG. 8 is a partly longitudinal sectional view of still another embodiment of the hydraulic reacting portion of the invention.
Figure 9:
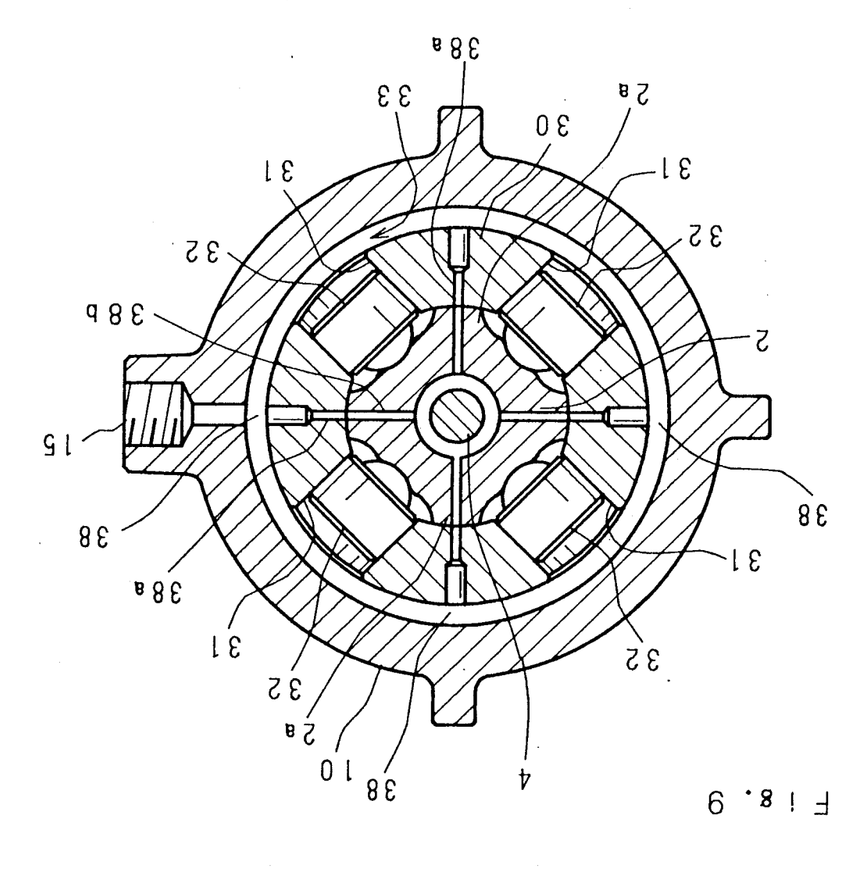
FIG. 9 is a cross sectional view along the line IX—IX shown in FIG. 8.

FIG. 8 is a longitudinal sectional view of the major parts showing further embodiment of the present invention. FIG. 9 is a cross sectional view along the line IX—IX shown in FIG. 8.

In the embodiment shown in FIGS. 3 through 5 or the embodiment shown in FIG. 7, the throttle holes are provided on a side wall of the through holes 31 in which the plungers 32 move. Instead of the above construction, the throttle holes are provided in a straight line extending from the cylindrical portion 30 of the output shaft 3 to the input shaft 2 in such a condition that the reaction chamber 33 are connected with a space being the low pressure side between the input shaft 2 and the torsion bar 4.

That is, between through holes 31, 31 being adjacent from each other and slidably fitted to respective plungers 32, the oil path 38a of a small diameter penetrating thereof is provided at the cylindrical portion 30 of the output shaft 3. And at the input shaft 2, the other diameter of the concave portion engaging the convex portion of the plunger 32 is thickened to the extent slightly smaller than the inside diameter of the cylindrical portion 30. At a position opposite to the oil path 38a on each of the thickened portion, an oil path 38b radially penetrating the input shaft 2 is provided. The opposite areas at the opposed end portions of both of the oil paths 38a, 38b are so formed as to be smaller when the relative angular displacement between the cylindrical input shaft 2 and the cylindrical portion 30 becomes larger. Conversely, it becomes larger when the relative angular displacement becomes smaller.

In addition, in this embodiment, there are no throttle holes 36, return chamber 35, and return holes 16, 17 all being provided in the embodiment shown in FIGS. 3 through 5, but a throttle hole 38 and oil paths 38a, 38b are provided in the state of being connected with the reaction chamber 33 and the low pressure side.

The other constitution of this embodiment is substantially the same as the embodiment shown in FIGS. 3 through 5.

Then, in the embodiment of such construction, a hydraulic pressure from the vehicle speed sensor pump SP is introduced into the reaction chamber 33 from the introducing pressure port 15 so as to apply pressure corresponding to the vehicle speed onto the back face of each plunger 32, thereby the plunger 32 being pushed against the outer peripheral surface of the input shaft 2. And at the same time, the pressure oil flows into a space between the input shaft 2 and the torsion bar 4 through the oil path 38a of the cylindrical portion 30 and the oil path 38b of the input shaft 2, and then, returns to the oil tank T being as a low pressure side from the return port 14 in substantially the same way as the embodiment shown in FIGS. 3 through 5.

When steering torque is exerted upon the steering wheel to generate relative angular displacement corresponding to torsion of the torsion bar 4 between the input shaft 2 and the cylindrical portion 30, the opposed areas of the oil path 38a, 38b is changed, that is, when the relative angular displacement becomes larger, the opposed areas becomes smaller, and when the relative angular displacement becomes smaller, the opposed areas becomes larger, thereby, the pressure in the reaction chamber 33 is made variable according to the angle of the steering wheel. In other words, as the steering angle becomes larger, dislocation between the oil path 38a, 38b becomes larger, thereby the rigidity of the steering wheel is increased according to the steering angle.

As described in detail in the above, in the power steering apparatus related to the invention, the introduced hydraulic pressure to the reaction chamber can be varied according to both of the vehicle speed and the angle of the steering wheel, thereby improving rectilinear propagation stability at a high speed running of a vehicle so as to obtain a comfortable steering feeling. In addition, an increase characteristic of the steering assisting force can be loosened compared with the conventional power steering apparatus, and after the steering torque to be exerted on the steering wheel reaches the predetermined magnitude, the rigidity of the steering wheel is not liable to be constant, thereby desirable steering feeling in which the rigidity of the steering wheel continuously increases can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A power steering apparatus comprising:
   a hydraulic actuator for generating steering assisting force by hydraulic pressure being supplied from a pressure source to a low pressure side;
   a hydraulic control valve for controlling said hydraulic pressure to be supplied to said hydraulic actuator according to a quantity of relative movement between a valve body and a casing thereof accompanying a steering operation;
   a first restriction means for exerting restriction force corresponding to at least vehicle speed against the relative movement between said valve body and said casing, wherein said first restriction means has plungers being installed movably at a part of said casing and a reaction chamber being formed at one side in the direction of movement of said plunger so as to supply hydraulic pressure from a vehicle speed pump to said plungers corresponding to vehicle speed, said first restriction means applying its restriction force corresponding to said hydraulic pressure being introduced to said reaction chamber so as to exert it against said relative movement through said plungers wherein said first restriction means exerts restriction force corresponding to hydraulic pressure being supplied from a vehicle speed pump for generating hydraulic pressure corresponding to vehicle speed;
   a second restriction means for exerting restriction force corresponding to said quantity of relative movement against the relative movement between said valve body and said casing;
   wherein said second restriction means has a throttled path being provided between said reaction chamber and low pressure side and whose opening is controlled according to the movement of said plungers being generated due to said relative movement.

2. A power steering apparatus as set forth in claim 1, wherein said first restriction means increases its restriction force as vehicle speed becomes higher.

3. A power steering apparatus as set forth in claim 1, wherein said second restriction means increases its restriction force as said quantity of relative movement becomes larger.

* * * * *